`US008077022B2`

United States Patent
Baruco et al.

(10) Patent No.: US 8,077,022 B2
(45) Date of Patent: Dec. 13, 2011

(54) SYSTEM AND METHOD FOR ACTIVATING VEHICULAR ELECTROMECHANICAL SYSTEMS USING RF COMMUNICATIONS AND VOICE COMMANDS RECEIVED FROM A USER POSITIONED LOCALLY EXTERNAL TO A VEHICLE

(75) Inventors: Samuel R. Baruco, Aurora (CA); Reginald C. Grills, Oshawa (CA)

(73) Assignee: Flextronics Automotive Inc., Ontario (CA)

( * ) Notice: Subject to any disclaimer, the term of this patent is extended or adjusted under 35 U.S.C. 154(b) by 492 days.

(21) Appl. No.: 12/155,874

(22) Filed: Jun. 11, 2008

(65) Prior Publication Data
US 2009/0309713 A1 Dec. 17, 2009

(51) Int. Cl.
*B60R 25/10* (2006.01)
(52) U.S. Cl. .......... 340/426.13; 340/426.14; 340/426.16
(58) Field of Classification Search ............... 340/425.5, 340/426.1, 426.13, 426.16, 426.35, 539.11, 340/5.52, 426.14; 704/233, 274, 275; 455/569.2, 455/41.2; 701/33; 382/224; 711/117
See application file for complete search history.

(56) References Cited

U.S. PATENT DOCUMENTS

| | | | |
|---|---|---|---|
| 4,797,924 A | 1/1989 | Schnars et al. | |
| 5,199,080 A | 3/1993 | Kimura et al. | |
| 5,704,008 A | 12/1997 | Duvall, Jr. | |
| 5,777,571 A | 7/1998 | Chuang | |
| 5,812,067 A | 9/1998 | Bergholz et al. | |
| 6,028,537 A * | 2/2000 | Suman et al. | 340/988 |
| 6,140,939 A | 10/2000 | Flick | |
| 6,396,954 B1 * | 5/2002 | Kondo | 382/224 |
| 6,496,107 B1 * | 12/2002 | Himmelstein | 340/426.1 |
| 6,711,474 B1 * | 3/2004 | Treyz et al. | 701/1 |
| 6,792,295 B1 * | 9/2004 | Hanevich et al. | 455/569.1 |
| 6,836,822 B1 * | 12/2004 | Hatano et al. | 711/117 |
| 6,906,632 B2 * | 6/2005 | DeLine et al. | 340/815.4 |
| 6,952,155 B2 * | 10/2005 | Himmelstein | 340/5.52 |
| 7,212,966 B2 | 5/2007 | Kyomitsu | |
| 7,349,722 B2 * | 3/2008 | Witkowski et al. | 455/569.2 |
| 7,548,491 B2 * | 6/2009 | Macfarlane | 367/198 |
| 2003/0064755 A1 | 4/2003 | Piwowarski | |
| 2004/0143437 A1 * | 7/2004 | Hanood | 704/258 |
| 2005/0043067 A1 | 2/2005 | Odell et al. | |
| 2010/0063670 A1 * | 3/2010 | Brzezinski et al. | 701/33 |

FOREIGN PATENT DOCUMENTS

EP 770749 A2 * 5/1997
WO WO 2004/059402 A1 7/2004

OTHER PUBLICATIONS

PCT Notification of Transmittal of The International Search Report; (Oct. 5, 2009); (PCT/IB2009/005864).

* cited by examiner

*Primary Examiner* — Van T. Trieu
(74) *Attorney, Agent, or Firm* — Patton Boggs LLP

(57) ABSTRACT

A system and method for activating electromechanical systems of a vehicle may include at least one antenna coupled to a vehicle and configured to receive wireless communications signals. At least one microphone may be coupled to the vehicle and configured to receive sounds external to the vehicle. A control unit may be in communication with the antenna(s) and be configured to receive the wireless communications signals. A voice recognition system may be in communication with the microphone(s). A transponder/keyfob may be utilized to determine when a user is locally external to the vehicle and, in response to determining that the user is locally external to the vehicle, the microphones may be polled to receive a voice command from the user to activate an electromechanical system.

15 Claims, 3 Drawing Sheets

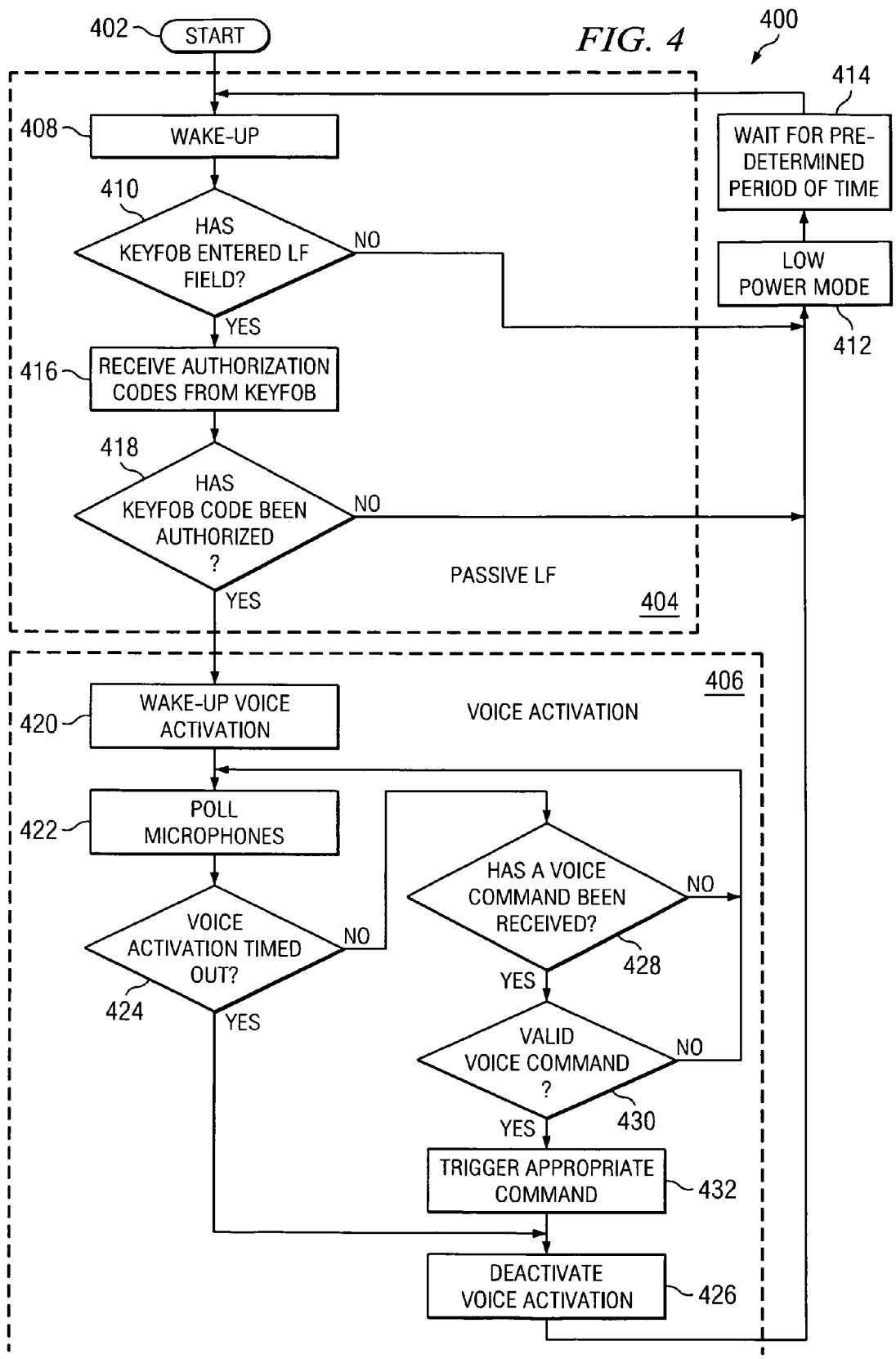

SYSTEM AND METHOD FOR ACTIVATING VEHICULAR ELECTROMECHANICAL SYSTEMS USING RF COMMUNICATIONS AND VOICE COMMANDS RECEIVED FROM A USER POSITIONED LOCALLY EXTERNAL TO A VEHICLE

BACKGROUND

Designers of vehicles have embraced technology in recent years. Some of the technologies that have been incorporated into vehicles include electromechanical systems, such as automatic liftgates and sliding doors, remote control transponder/keyfobs, airbags, wireless remote starters, voice activated telephones and sound systems, and so forth. Many of these technologies improve safety, while others improve convenience for users. In many cases, consumers of vehicles are as much or more concerned about technology included in each vehicle than performance of the actual vehicle.

SUMMARY

To further improve conveniences of vehicles, the principles of the present invention incorporate wireless communications and voice communications external to a vehicle to activate electromechanical systems of the vehicle. By using both wireless communications, such as passive, active, and/or semi-passive transponder/keyfobs incorporated into transponder/keyfobs, and voice recognition systems, safety and security is provided by preventing unauthorized or undesired activation of the electromechanical systems.

One embodiment of a system for activating electromechanical systems of a vehicle may include at least one antenna coupled to a vehicle and configured to receive wireless communications signals. At least one microphone may be coupled to the vehicle and configured to receive sounds external to the vehicle. A control unit may be in communication with the antenna(s) and be configured to receive the wireless communications signals. A voice recognition system may be in communication with the microphone(s). A transponder/keyfob may be utilized to determine when a user is locally external to the vehicle and, in response to determining that the user is locally external to the vehicle, the microphones may be polled to receive a voice command from the user to activate an electromechanical system.

One method for activating electromechanical systems of a vehicle may include determining that a user is locally external to a vehicle. A voice recognition system may be activated in response to determining that the user is locally external to the vehicle. In response to receiving a voice command from the user external to the vehicle, an electromechanical system of the vehicle may be activated.

An embodiment of a vehicle may include a vehicle body and at least one microphone coupled to the vehicle body, where the microphone(s) may be configured to receive sounds external to the vehicle body. At least one antenna may be coupled to the vehicle body and configured to receive wireless communications signals. A control unit may be disposed within the vehicle body and be in communication with the antenna(s). A voice recognition system may be in communication with the microphone(s).

BRIEF DESCRIPTION OF THE DRAWINGS

Illustrative embodiments of the present invention are described in detail below with reference to the attached drawing figures, which are incorporated by reference herein and wherein:

FIG. 4 is a flow diagram of an exemplary process for controlling electromechanical systems of a vehicle from a voice command received locally external to the vehicle.

DETAILED DESCRIPTION

Figure 1:
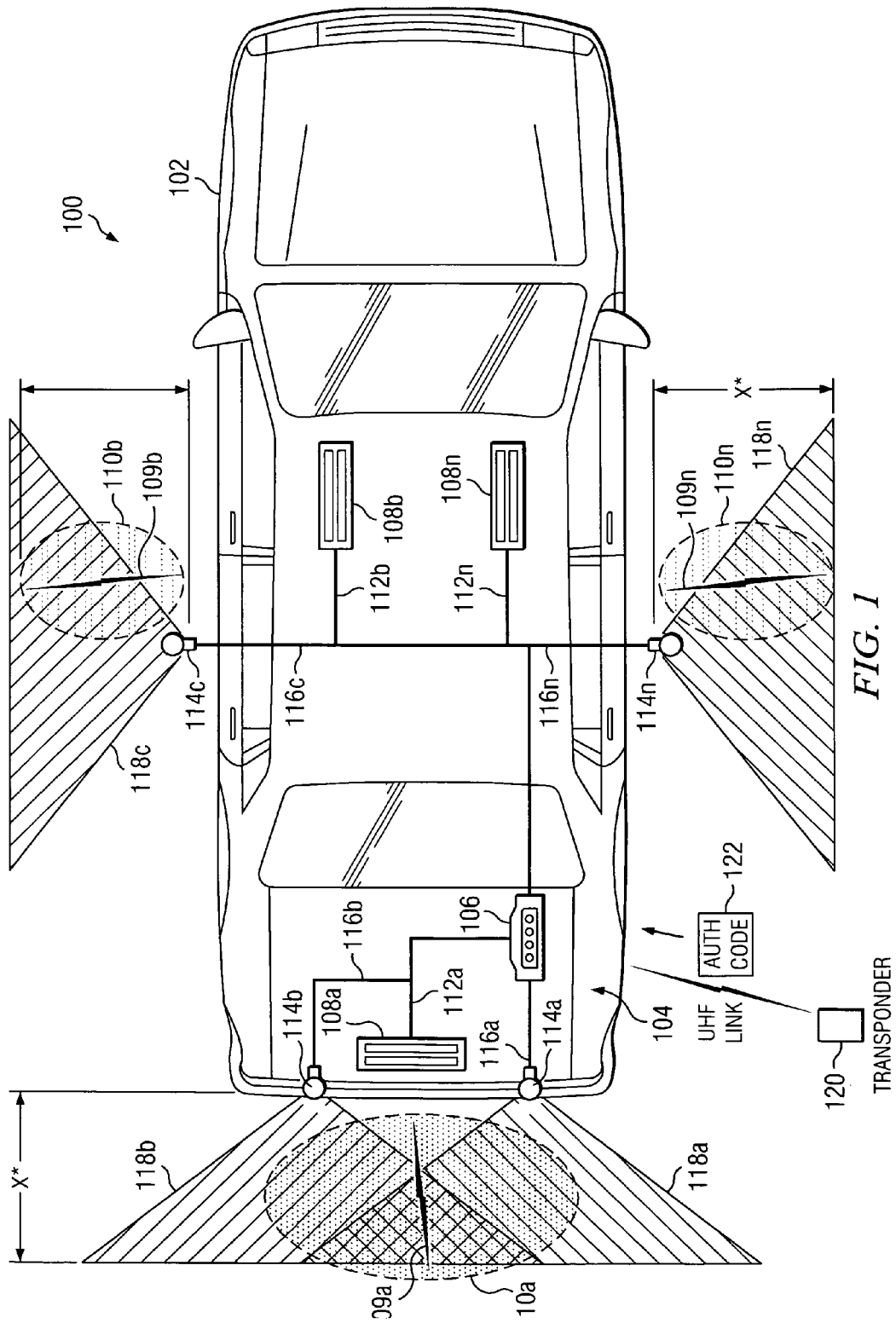
FIG. 1 is an illustration of an exemplary vehicle that enables a user to activate electromechanical systems using voice commands locally external to the vehicle.

FIG. 1 is an illustration of an exemplary vehicle 100 that enables a user to activate electromechanical systems using voice commands locally external to the vehicle 100. The vehicle 100 includes a vehicle body 102 that defines the vehicle 100. For the purposes of this description, the vehicle body may include any structure or component of the vehicle 100, including roof, sidewalls, doors, windows, bumpers, seats, mirrors, and any other physical feature of the vehicle 100.

A radio frequency (RF) system 104 may include an RF base station 106 that is configured to transmit and receive RF frequency signals. The RF base station 106 may be configured as a single unit or multiple units. The RF base station 106 may be in communication with one or more RF antennas 108a-108n (collectively 108) and may be configured to transmit and receive wireless communications signals, such as RF signals 109a-109n (collectively 109), from the vehicle 100. In one embodiment, the RF signals 109 may be low frequency (LF) RF signals. The (LF) RF signals may range between approximately 18 kHz and approximately 150 kHz, for example. The RF antennas 108 may be dipole, conic, or other shaped antennas. The RF antennas 108 may each be the same or different shape to generate the same or different shaped antenna patterns 110a-110n (collectively 110), respectively. The antenna patterns 110 may be directional or omni-directional. In one embodiment, communication paths 112a-112n (collectively 112) between the RF antennas 108 and RF base station 106 may be hardwired or wireless. A wireless communication path may use Bluetooth or any other communication protocol. A hardwired communication path may use a conventional vehicular bus architecture, such as CAN, LIN, or J1850. Alternatively, a non-standard vehicular bus architecture may be utilized.

In addition to the RF antennas 108, the RF base station 106 may be in communication with one or more microphones 114a-114n (collectively 114) configured to receive sounds locally external to the vehicle. In one embodiment, at least one other microphone (not shown) may be positioned with the vehicle to provide added convenience to users to control electromechanical systems of the vehicle. The microphones 114 may be configured to operate over a frequency range that includes speech or voice frequencies, as understood in the art. The microphones 114 may be in communication with the RF base station 106 via communication paths 116a-116n (collectively 116). The communication paths 116 may be hardwired or wireless. In one embodiment, the communication paths 112 and 116 use the same bus. Alternatively, a different bus and/or communications protocol may be utilized for the microphones 114 than the RF antennas 108. Each of the microphones 114 may be the same or different and operate to have the same or different coverage patterns 118-118n, respectively.

The RF antennas 108 may be coupled to the vehicle body in any manner and be positioned to have antenna patterns 110 that partially or completely surround the vehicle 100. The RF base station 106 may be configured with a gain to cause the antenna patterns 110 to be constant or variable based on manufacturer and/or user settings. Similarly, the RF base station 106 may be configured with a gain for the coverage patterns 118 to be constant or vary. It should be understood that the number of antennas 108 and microphones 114 may be the same or different and vary depending on the size, model, type, or any other difference between vehicles produced by one or more vehicle manufacturers. It should further be understood that the vehicle may be any motor, rail, aircraft, or watercraft vehicle that is consumer, commercial, or military.

As further shown in FIG. 1, a transponder/keyfob 120 may be used to communicate with the RF base station 106 via the RF antennas 108. The transponder/keyfob 120 may be incorporated into a transponder/keyfob, as understood in the art. In one embodiment, the transponder/keyfob 120 is a passive transponder/keyfob (e.g., radio frequency identification (RFID) tag) that responds to receiving one of the RF signals 109 that operate as a detection signal from the RF base station 106 when in a local range (i.e., within one of the antenna patterns 110) of the vehicle 100. The transponder/keyfob 120 may generate and communicate at least one authorization code(s) 122 that identifies the transponder/keyfob 120 as being associated with the RF base station 106 and/or vehicle 100. Alternatively, the transponder/keyfob 120 may be an active device that enables active RF communication with the RF base station 106. Generally, an active transponder/keyfob 120 may include a power source for powering an integrated circuit contained within the transponder/keyfob 120 and transmitting a signal back to the RF base station 106. The desired distance of operation of the transponder/keyfob 120 to the RF base station 106 may be relevant in determining whether to use a passive or active transponder/keyfob 120, as known to those skilled in the art. In addition, semi-passive transponder/keyfob 120 may be used to power a microchip, but not the return signal to the RF base station 106.

The RF base station 106, RF antennas 108, and microphones 114 may be designed and configured to cause the antenna patterns 110 and coverage patterns 118 to overlap and cover the same or similar areas. By covering the same or similar areas, a user who enters an antenna pattern 110b will know that the microphone 114c with the respective coverage pattern 118c will receive his or her voice command. By the antenna patterns 110 and coverage patterns 118 having the same or similar areas, a determination that a user is locally external to the vehicle 100 can be made when the transponder/keyfob 120 is within an antenna pattern 110 and, more definitively, when a voice command is received from the user.

Figure 2:
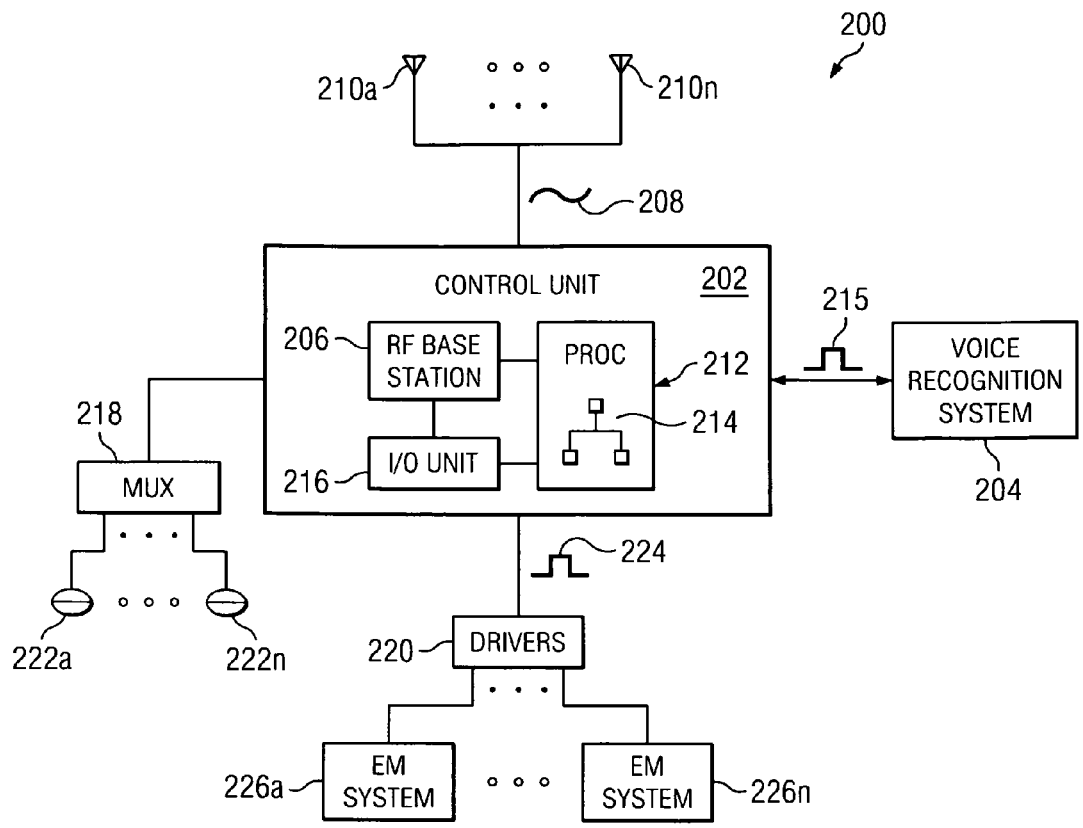
FIG. 2 is a block diagram of an exemplary electrical system that enables a user to control electromechanical systems when the user is locally external from a vehicle.

FIG. 2 is a block diagram of an exemplary electrical system 200 that enables a user to control electromechanical systems when the user is locally external from a vehicle. The electrical system 200 may include a control unit 202 and voice recognition system 204. In one embodiment, the control unit 202 and voice recognition system 204 are separate devices. Alternatively, the control unit 202 and voice recognition system 204 may be combined in a single device. The control unit 202 may include an RF base station 206 that operates to transmit, receive, and process RF signals 208 via antennas 210a-210n (collectively 210). Alternatively, the RF base system 206 may be a device external from the control unit 202. The control unit 202 may further include a processing unit 212 that executes software 214 that operates to communicate with the RF base system 206 and voice recognition system 204. In one embodiment, the voice recognition system 204 is integrated into the software 214. In response to the control unit 202 receiving a voice command from a user locally external to the vehicle, the control unit 202 may communicate the voice command to the voice recognition system 204, which, in response, may communicate a command notification signal 215, in either a digital or analog format, to the control unit 202, and, more specifically, the processing unit 212 to respond accordingly.

An I/O unit 216 may be in communication with the RF base station 206 and/or processing unit 212 and be configured to communicate with the antennas 210, voice recognition system 204, and other devices, including a multiplexer 218 and drivers 220. In an alternative embodiment, the control unit 202 may include the multiplexer 218 and/or drivers 220.

The multiplexer 218 may be configured to communicate with microphones 222a-222n (collectively 222). As described with respect to FIG. 1, the microphones 222 may be configured such that sounds are collected external to a vehicle by the microphones 222. To minimize wiring, power, and controller inputs, the multiplexer 218 may operate to individually and selectively collect sounds from each of the antennas 210. The drivers 220 may include power circuitry that is configured to receive control signals 224, either digital or analog, and drive electromechanical systems 226a-226n (collectively 226). Although described as being electromechanical, for the purposes of this description, the electromechanical systems 226 may alternatively be exclusively electrical, wireless, optical, electro-optical, optoelectromechanical (e.g., fiber optic to electromechanical). In other words, the electromechanical systems 226 may be any system of a vehicle that the control unit 202 is configured to control in response to a user providing a voice command.

In operation, the control unit 202 may be configured to control operation of the RF and electromechanical systems of the vehicle. The processing unit 212 being in communication with the RF base station 206 and voice recognition system 204 may be configured to process or manage processing of signals being received locally external to the vehicle and drive appropriate electromechanical systems in response, as described with regard to FIGS. 3 and 4.

Figure 3:
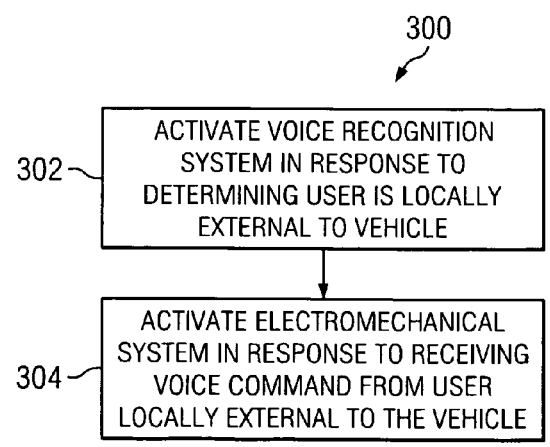
FIG. 3 is a flow diagram of an exemplary process for a user to control electromechanical systems of a vehicle utilizing the principles of the present invention.

FIG. 3 is a flow diagram of an exemplary process 300 for a user to control electromechanical systems of a vehicle utilizing the principles of the present invention. The process 300 starts at step 302, where a voice recognition system may be activated in response to determining that a user is locally external to a vehicle. In determining that the user is locally external to the vehicle, a control unit may emit an RF signal to cause a transponder/keyfob that may be carried, in a pocket, hand, or otherwise, by a user to passively respond and be detected. To avoid undesired or unauthorized activation of the voice recognition system, the transponder/keyfob may generate and communicate one or more authorization code(s) that a control unit recognizes as being associated with the respective vehicle. By using passive detection of the transponder/keyfob, the user is provided with a sense of convenience. As an alternative, the vehicle may have a keypad for receiving a code or password or a sensor to identify a user such that the user being locally external to the vehicle may be determined.

To minimize power, the control unit may be maintained in a "sleep mode" and may "wake up" and actively determine whether a passive transponder/keyfob is local to the vehicle through use of one or more antenna. By using passive detection of the transponder/keyfob, the user is provided with a sense of convenience. Alternatively, the control unit may receive an active communication from an active transponder/ keyfob, but with a short range so that a user is within range of the speakers to hear his or her voice commands.

At step 304, in response to receiving a voice command from a user external to the vehicle, an electromechanical system may be activated. One or more voice commands may be available to a user in controlling electromechanical systems of the vehicle. For example, the voice command(s) may include "open decklid," "close decklid," "unlock doors," "lock doors," "open liftgate," "open sliding door," "open windows," "close sliding door(s)," "turn on alarm," "turn off alarm," "start vehicle," "turn off vehicle," and any other voice command that the manufacturer may desire. In one embodiment, the system may be user programmable such that the user may create voice commands to control the electromechanical systems. An audible sound, such as one or more beeps and/or a synthesized voice, may be generated in response to a voice command being correctly received. Similarly, a different sound may be generated in response to a voice command being improperly received. Further, a visual indicator may be used with or in place of an audible sound. Some exemplary visual indicators include: light emitting diodes, lamps, bulbs, and the like.

FIG. 4 is a flow diagram of an exemplary process 400 for controlling electromechanical systems of a vehicle from a voice command received locally external to the vehicle. The process 400 is a more detailed process than that shown in FIG. 3. In addition, the process 400 may be performed using the system configurations of either or both FIGS. 1 and 2. The process 400 starts at step 402. Two sub-processes, passive low frequency sub-process 404 and voice activation sub-process 406, are utilized to securely enable a user to operate the electromechanical systems. The passive low frequency sub-process 404 starts at step 408, where the passive low frequency sub-process 404 wakes-up. As previously described, the control unit may operate in a low power mode, where processors and other electrical devices may be set to low power or sleep modes to conserve power. Once awake, the control unit operates to determine whether a transponder/keyfob is locally external to the vehicle at step 410. In being locally external to the vehicle, a determination is made as to whether the transponder/keyfob is within an antenna pattern of an RF antenna. If a transponder/keyfob is not determined to be locally external to the vehicle, then the process 400 continues at step 412, where the control unit is returned to a low power mode or sleep mode. At step 414, the process 400 waits for a predetermined time period before waking up again at step 408. For example, the predetermined time period may be one second, three seconds, or any other time period.

If it is determined at step 410 that a transponder/keyfob which is synonymous to the user, is locally external to the vehicle, then the process 400 continues at step 416, where one or more authorization code(s) are received from the transponder/keyfob. At step 418, a determination is made as to whether the authorization code(s) are authorized. If not, then the process 400 continues at step 412 to return the system to a low power mode. Otherwise, voice activation sub-process 406 starts at step 420, where voice activation operating on a voice recognition system may be woken up. In waking up, one or more visual and/or audible indicators may notify the user that the voice recognition system is active. At step 422, one or more microphones may be polled. If the antennas are aligned or otherwise associated with the microphones (e.g., rear antenna and rear microphone), then the microphone associated with the antenna that received an RF signal from the transponder/keyfob may be polled or polled first. At step 424, a determination may be made as to whether voice activation times out after a predetermined time period (e.g., five seconds). If the voice activation is timed out, then the process continues at step 426, where voice activation is deactivated. The process 400 continues at step 412.

If at step 424 the voice activation is not timed out and a voice command is determined not to be received at step 428, then the process returns to step 422, where the microphones may continue being polled. If a voice command is received, a determination is made at step 430 as to whether the voice command is a valid voice command. If not, the process 400 returns to step 422 to poll the microphones again. If it is determined at step 430 that a valid voice command was received, then at step 432, an appropriate command is triggered to cause an electromechanical system to be activated. The process 400 continues at step 426, where the voice activation is deactivated. It should be understood that the process 400 is exemplary and that alternative or additional steps may be performed and be within the scope of the principles of the present invention.

The previous detailed description of a small number of embodiments for implementing the invention is not intended to be limiting in scope. One of skill in this art will immediately envisage the methods and variations used to implement this invention in other areas than those described in detail. The following claims set forth a number of the embodiments of the invention disclosed with greater particularity.

What is claimed is:

1. A system for activating electromechanical systems of a vehicle, said system comprising:
   at least one antenna coupled to a vehicle and configured to receive wireless communications signals;
   at least one microphone coupled to the vehicle and configured to receive sounds external to the vehicle;
   a control unit in communication with said at least one antenna and configured to receive the wireless communications signals, wherein the control unit includes programming instructions for operation in two modes, the two modes including sleep mode and wake up mode; and
   a voice recognition system in communication with said at least one microphone, wherein the at least one antenna includes of antennas and the at one microphone includes plurality of microphones, and wherein the plurality of antennas are arranged such that antenna coverage patterns overlap microphones coverage patterns of the plurality of microphones and each of the antenna coverage patterns is associated with a microphone of the plurality of microphones.

2. The system according to claim 1, further comprising a transponder/keyfob configured to generate a wireless communications signal in response to receiving a detection signal communicated by said control unit via said at least one antenna.

3. The system according to claim 2, wherein said transponder/keyfob is further configured to generate and communicate at least one authentication code.

4. The system according to claim 2, wherein said control unit is configured to transmit a low frequency signal and, in response to said transponder/keyfob being within range of the low frequency signal, receive a response signal from the transponder/keyfob of the low frequency signal.

5. The system according to claim 1, wherein said control unit is further configured to activate said voice recognition system in response to determining that a wireless communications signal has been received.

6. The system according to claim 5, wherein said voice recognition system is configured to determine if a valid voice command is received by said at least one microphone.

7. The system according to claim 6, wherein said voice recognition system is further configured to generate and communicate a command notification signal to said control unit in response to determining a voice command, and wherein said control unit is further configured to generate a command signal to command an electromechanical system to activate.

8. The system according to claim 1, further comprising a multiplexer coupled to said at least one microphone.

9. The system according to claim 1, wherein said voice recognition system is part of said control unit.

10. The system according to claim 1, wherein said control unit is configured to; receive a notification signal indicative of said at least one antenna receiving a wireless communication signal;
   receive voice signals representative of a voice command to activate an electromechanical system;
   determine voice command received;
   generate a command signal based on the voice command; and
   communicate the command signal to the electromechanical system to cause the electromechanical system to activate.

11. A method for activating electromechanical systems of a vehicle, said method comprising:
   determining that a user is locally external to a vehicle;
   activating a voice recognition system in response to determining that the user is locally external to the vehicle, the voice recognition system including a plurality of antennas and a plurality of microphones, the plurality of antennas arranged such that antenna coverage patterns overlap microphones coverage patterns of the plurality of microphones and each of the antenna coverage patterns is associated with a microphone of the plurality of microphones;
   determining what microphone will receive a voice command from the user based on the antenna coverage pattern the user is located in; and
   in response to receiving a voice command from the user external to the vehicle, activating an electromechanical system of the vehicle.

12. The method according to claim 11, wherein determining that the user is locally external to the vehicle includes:
   transmitting an RF signal from the vehicle; and
   receiving a response signal indicative of a user being within an antenna pattern of the antenna coverage patterns.

13. The method according to claim 12, wherein receiving the response signal includes receiving at least one authentication code.

14. The method according to claim 11, wherein determining that a user is locally external to the vehicle includes receiving an RF signal from a passive transponder/keyfob.

15. The method according to claim 11, further comprising multiplexing sound signals from a plurality of microphones configured to receive sounds external to the vehicle.

* * * * *